US011731686B2

(12) United States Patent
Farshizadeh et al.

(10) Patent No.: US 11,731,686 B2
(45) Date of Patent: Aug. 22, 2023

(54) METHOD FOR POSITION CONTROL FOR A STEERING SYSTEM

(71) Applicant: ZF Automotive Germany GmbH, Alfdorf (DE)

(72) Inventors: Emad Farshizadeh, Düsseldorf (DE); Martin Scherberich, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 147 days.

(21) Appl. No.: 17/112,487

(22) Filed: Dec. 4, 2020

(65) Prior Publication Data

US 2021/0171094 A1    Jun. 10, 2021

(30) Foreign Application Priority Data

Dec. 4, 2019  (DE) .......................... 102019133025.4

(51) Int. Cl.
 *B62D 5/04*  (2006.01)
(52) U.S. Cl.
 CPC ......... *B62D 5/0463* (2013.01); *B62D 5/0481* (2013.01)
(58) Field of Classification Search
 CPC ..... B62D 5/0463; B62D 5/0481; B62D 6/002
 See application file for complete search history.

(56) References Cited

U.S. PATENT DOCUMENTS

| | | | | |
|---|---|---|---|---|
| 4,757,869 | A * | 7/1988 | Morishita | ............ B62D 5/0478 701/41 |
| 5,392,163 | A * | 2/1995 | Higuchi | ................. H04N 9/802 386/E5.008 |
| 5,703,775 | A * | 12/1997 | Yamamoto | ............. B62D 5/046 701/41 |
| 6,322,160 | B1 * | 11/2001 | Loh | ......................... B60T 17/00 303/87 |

(Continued)

FOREIGN PATENT DOCUMENTS

| | | | | |
|---|---|---|---|---|
| CN | 101218146 | A * | 7/2008 | ........... B62D 5/0463 |
| CN | 104477231 | A * | 4/2015 | ........... B62D 5/0457 |

(Continued)

OTHER PUBLICATIONS

"A New Control Strategy of an Electric-Power-Assisted Steering System;" Marouf et al.; IEEE Transactions on Vehicular Technology (vol. 61, Issue: 8, pp. 3574-3589); Dec. 14, 2012.*

(Continued)

*Primary Examiner* — Khoi H Tran
*Assistant Examiner* — Jorge O Peche
(74) *Attorney, Agent, or Firm* — Robert James Harwood (57) ABSTRACT

A method is described for position control for an electromechanically assisted steering system of a motor vehicle, which has electromechanical steering assistance with an electric motor and at least one controller, wherein a torque to be applied by the electric motor is the controlled variable of the at least one controller, and wherein the controlled system for the design of the at least one controller comprises (Continued)

at least a lower part of the steering system containing the electric motor. A frequency response of the controlled system is determined based on a mathematical model of the controlled system and/or by measuring the controlled system. Controller parameters of the at least one controller are adjusted based on the frequency response of the controlled system.

4 Claims, 3 Drawing Sheets

(56) References Cited

U.S. PATENT DOCUMENTS

| | | | | |
|---|---|---|---|---|
| 9,102,352 | B1* | 8/2015 | Nierobisch | B62D 5/0472 |
| 10,359,690 | B2* | 7/2019 | Wagner | F16M 11/105 |
| 11,091,193 | B2* | 8/2021 | Pramod | H02P 21/18 |
| 11,370,477 | B2* | 6/2022 | Kuramitsu | B62D 6/008 |
| 11,511,795 | B2* | 11/2022 | Eickholt | B62D 5/046 |
| 2001/0049577 | A1* | 12/2001 | Kesselgruber | F16D 66/00 701/70 |
| 2004/0050203 | A1* | 3/2004 | Oblizajek | B62D 7/222 74/552 |
| 2005/0206100 | A1* | 9/2005 | Ohta | B60G 21/0555 280/5.511 |
| 2006/0017255 | A1* | 1/2006 | Kappich | B60G 3/20 280/124.134 |
| 2006/0069481 | A1* | 3/2006 | Kubota | B62D 5/0463 701/41 |
| 2009/0079373 | A1* | 3/2009 | Nagase | B62D 5/0487 318/434 |
| 2009/0120085 | A1* | 5/2009 | Yamaura | B62D 5/065 60/423 |
| 2013/0006476 | A1* | 1/2013 | Yamazaki | B60W 10/18 701/42 |
| 2013/0030654 | A1* | 1/2013 | Oblizajek | B62D 6/008 701/42 |
| 2013/0060426 | A1* | 3/2013 | Watanabe | B62D 5/0463 701/42 |
| 2015/0145449 | A1* | 5/2015 | Mukai | H02P 29/0241 318/400.22 |
| 2015/0232121 | A1* | 8/2015 | Nierobisch | B62D 5/0472 701/41 |
| 2017/0322585 | A1* | 11/2017 | Tomita | G05B 19/4184 |
| 2019/0152515 | A1* | 5/2019 | Longuemare | B62D 6/008 |
| 2019/0329818 | A1* | 10/2019 | Shoji | B62D 6/002 |
| 2019/0389505 | A1* | 12/2019 | Pramod | H02P 6/08 |
| 2020/0162618 | A1* | 5/2020 | Enteshari | H04M 3/562 |
| 2020/0180684 | A1* | 6/2020 | Kuramitsu | B62D 5/04 |
| 2020/0235679 | A1* | 7/2020 | Jeong | H02P 23/0022 |
| 2021/0171094 | A1* | 6/2021 | Farshizadeh | B62D 5/0463 |
| 2021/0179166 | A1* | 6/2021 | Bergmann | B62D 5/006 |
| 2021/0255640 | A1* | 8/2021 | Imamura | G05D 1/0206 |
| 2021/0276616 | A1* | 9/2021 | Inden | B62D 15/025 |
| 2021/0354752 | A1* | 11/2021 | Husslein | H03H 17/06 |
| 2022/0194463 | A1* | 6/2022 | Palandre | B62D 5/0484 |
| 2022/0289286 | A1* | 9/2022 | Keßler | B62D 5/0457 |
| 2022/0315193 | A1* | 10/2022 | Ikegame | G05D 1/0206 |

FOREIGN PATENT DOCUMENTS

| | | | | |
|---|---|---|---|---|
| CN | 109204447 A | * | 1/2019 | B62D 5/0457 |
| CN | 110406589 A | * | 11/2019 | B62D 1/286 |
| CN | 110461686 A | * | 11/2019 | B62D 5/0463 |
| CN | 111212778 A | * | 5/2020 | B62D 15/025 |
| CN | 109219553 B | * | 3/2021 | B62D 1/286 |
| CN | 112918550 A | * | 6/2021 | B62D 5/046 |
| CN | 110248860 B | * | 11/2021 | B62D 5/0409 |
| CN | 113581167 A | * | 11/2021 | |
| DE | 102006033458 A1 | * | 1/2007 | B62D 5/0463 |
| DE | 102017110548 A1 | * | 11/2018 | B62D 1/286 |
| DE | 102017110549 A1 | * | 11/2018 | B62D 1/286 |
| DE | 102017121952 A1 | * | 3/2019 | B62D 1/16 |
| DE | 102019133025 A1 | * | 6/2021 | B62D 5/0463 |
| DE | 102019134143 A1 | * | 6/2021 | B62D 1/04 |
| DE | 102018112322 B4 | * | 7/2021 | B62D 5/0409 |
| DE | 102012005116 B4 | * | 11/2021 | B62D 5/0481 |
| DE | 102012004915 B4 | * | 2/2022 | B62D 1/286 |
| DE | 102021209380 B3 | * | 5/2022 | |
| DE | 102021202740 A1 | * | 9/2022 | |
| EP | 3572300 A1 | * | 11/2019 | B62D 1/286 |
| EP | 4122801 A1 | * | 1/2023 | |
| JP | S63215465 A | * | 1/1988 | |
| JP | 2006007931 A | * | 1/2006 | |
| JP | 2006056473 A | * | 3/2006 | |
| JP | 2006117223 A | * | 5/2006 | B62D 5/0463 |
| JP | 4120427 B2 | * | 7/2008 | B62D 5/008 |
| JP | 2010012933 A | * | 1/2010 | B62D 5/0463 |
| JP | 5776837 B2 | * | 9/2015 | B62D 5/0463 |
| KR | 20200091139 A | * | 7/2020 | |
| WO | WO-2017213130 A1 | * | 12/2017 | B62D 1/286 |
| WO | WO-2018052036 A1 | * | 3/2018 | B62D 1/286 |
| WO | WO-2018088456 A1 | * | 5/2018 | B62D 1/286 |
| WO | WO-2018143408 A1 | * | 8/2018 | B62D 1/286 |
| WO | WO-2018168897 A1 | * | 9/2018 | B62D 1/286 |
| WO | WO-2019026895 A1 | * | 2/2019 | B62D 1/286 |
| WO | WO-2020012689 A1 | * | 1/2020 | B62D 15/022 |

OTHER PUBLICATIONS

"Control of an Electric Power Assisted Steering system using reference model;" Marouf et al.; IEEE Conference on Decision and Control and European Control Conference (pp. 6684-6690); Dec. 1, 2011.*

"Modeling and Simulation of the Electric Power Steering System;" Zeng et al.; 2009 Pacific-Asia Conference on Circuits, Communications and Systems (pp. 236-239); May 1, 2009.*

* cited by examiner

METHOD FOR POSITION CONTROL FOR A STEERING SYSTEM

CROSS-REFERENCE TO RELATED APPLICATION

This application claims priority to German Patent Application No. 102019133025.4 filed Dec. 4, 2019, the disclosure of which is incorporated herein by reference in its entirety.

TECHNICAL FIELD

The present disclosure relates to a method for position control for an electromechanically assisted steering system of a motor vehicle. The present disclosure further relates to a control unit for an electromechanically assisted steering system, an electromechanically assisted steering system and a computer program.

BACKGROUND

Motor vehicles of the prior art are known to have a steering system with electromechanical steering assistance, wherein an electric motor of the electromechanical steering assistance can provide a torque to support the steering movement of the driver of the motor vehicle.

The electromechanical steering assistance assists the driver in steering and/or at least partially automatically steers the vehicle in a certain direction. In particular, the electromechanical steering assistance also steers the vehicle automatically, i.e. without a corresponding steering movement of the driver, based on a target position in a certain direction, for example using data from a camera or other sensors that capture an environment of the motor vehicle. The automatic steering of motor vehicles is used in particular in control systems of at least partially autonomous motor vehicles.

The steering systems of such vehicles, which are at least partially autonomous, typically have a position controller, which is designed to adjust a controlled variable to the corresponding driving situation and to transmit it to the steering system by means of the electric motor.

Reactions from the road to the steering system and non-linear effects can significantly affect the quality of the position control. Previously known control methods are therefore only available for certain driving situations or only with low control quality.

SUMMARY

The object of the present disclosure is to provide a method for position control for an electromechanically assisted steering system, in which the disadvantages from the prior art are at least partially no longer present.

The object is achieved according to the present disclosure by a method for position control for an electromechanically assisted steering system of a motor vehicle, which has electromechanical steering assistance with an electric motor and at least one controller, wherein a torque to be applied by the electric motor is the controlled variable of the at least one controller, and wherein the controlled system for the controller design of at least one controller includes at least a lower part of the steering system containing the electric motor. The method has the following steps: A frequency response of the controlled system is determined based on a mathematical model of the simplified controlled system and/or by measuring the controlled system, in particular the entire controlled system. The controller parameters of the at least one controller are adjusted based on the frequency response of the controlled system. At least one target position is generated and/or received. At least one actual position is recorded and returned, and the controlled variable is adjusted by means of the at least one controller based on a comparison of the at least one target position with the at least one actual position.

The controlled system for the design of the controller is therefore at least the lower part of the steering system, which contains the components below a torque sensor of the steering system. More specifically, the lower part of the steering system thus comprises the electric motor and other components arranged between the torque sensor and the wheels of the motor vehicle. In particular, the lower part of the steering system comprises a gearbox coupled to the electric motor. In addition, the lower part of the steering system may include a rack coupled to the wheels of the motor vehicle, more specifically to the front wheels and the steering column.

The at least one controller is part of a closed control circuit. The target position represents the control variable of the controller, while the actual position is the controlled variable of the controller.

The frequency response for the controller design can be determined by analytically calculating it based on the mathematical model of the lower part of the steering system, wherein the frequency response then depends on model parameters of the mathematical model. Alternatively or additionally, the frequency response can be determined by measuring the steering system, more precisely the entire controlled system.

In particular, the transmission function of the controlled system is determined only once and then stored for further use in a control unit of the steering system.

Furthermore, the controller parameters of the at least one controller can be determined once based on the frequency response of the controlled system. The controller parameters can then be stored for further use in a control unit of the steering system.

In other words, the controller parameters are thus determined, in particular optimized, at least once based on the frequency response of the controlled system.

The position control method described above can be applied to any type of steering system. In particular, the method according to the present disclosure is suitable for an electromechanically assisted steering system with steering column assistance as well as for steering systems in which a torque to be applied is transmitted to the rack via a pinion, a dual pinion, or a belt drive. Furthermore, the method according to the present disclosure is also suitable for steer-by-wire steering systems, in which there is no active mechanical connection between the steering wheel and the wheels.

The mathematical model can be based on a physical substitution model of the controlled system, in particular a simplified physical substitution model. In the physical substitution model, individual sections of the controlled system can be modeled as a mass with a spring and/or at least one attenuation, wherein the mass has a predefined moment of inertia in each case.

One aspect is that the controller parameters of the at least one controller are determined based on the symmetric optimum method. This method is particularly advantageous when disturbance affects the controlled system, for example in the form of friction and/or in the form of reactions from the road. In other words, the controller design, i.e. the determination of the controller parameters according to the method of the symmetrical optimum, allows that disturbance torques and/or disturbance forces can be well controlled and good control behavior is ensured.

According to a further aspect, the at least one actual position is a rotation angle of the electric motor and/or a rotation angle below a torque sensor of the steering system. In particular, the rotation angle of the electric motor is used when the angle of rotation below the torque sensor is not available by measurement.

In one embodiment of the present disclosure, an observer is designed, which determines the disturbance torques acting on the controlled system and/or frictional torques occurring in the controlled system. In other words, the disturbance torques and/or frictional torques are estimated, for example by means of a Kalman filter, wherein a state space model can be used for the estimation. In particular, the state space model is based on the above-mentioned simplified physical substitution model of the lower part of the steering system. The disturbance torques are, for example, reactions from the road that affect the steering system. The observer thus provides estimates of the disturbance torques and/or the frictional torques occurring in the controlled system. These estimates can be used to compensate for the disturbance torques and/or frictional torques by means of the controller.

Preferably, based on the determined disturbance torques and/or frictional torques, the controlled variable of the at least one controller is adjusted so that the disturbance torques and/or frictional torques are at least partially compensated, in particular fully compensated. The influence of the disturbance torques, for example the reactions of the road on the steering system, and/or the frictional torques in the steering system is thus at least partially eliminated, in particular completely eliminated. Accordingly, the method according to the present disclosure is also suitable for types of steering systems in which greater frictional torques occur.

Further preferably, the determined disturbance torques and/or frictional torques are introduced into the control circuit downstream of the at least one controller by a first insertion transfer function. In this way, the influence of the disturbance torques and/or the frictional torques is taken into account in the control circuit. In particular, the torque applied by the electric motor is adjusted based on the determined disturbance torques and/or frictional torques. In other words, the disturbance torques and/or frictional torques are at least partially compensated in this way, in particular completely compensated.

According to one aspect of the present disclosure, a torque resulting from a position of the steering wheel relative to the lower part of the steering system is determined and based thereon the controlled variable of the at least one controller is adjusted, in particular wherein the resulting torque is determined by means of a torque sensor. In particular, this is a torque applied by the driver. The torque applied by the electric motor is then adjusted accordingly based on the determined resulting torque.

A further aspect provides that the determined torque is introduced into the control circuit downstream of the at least one controller by means of a second insertion transfer function. In this way, the influence of the torques acting on the upper part of the steering column is taken into account in the control circuit. In particular, in this way the torque to be applied by the electric motor is adjusted based on the determined resulting torque.

The at least one controller can be a PID controller. In particular, parameters of the PID controller are determined based on the frequency response of the controlled system. For example, the parameters of the PID controller are determined according to the symmetric optimum method.

Another aspect provides that a PI controller and a P controller are provided in a cascade circuit, in particular wherein the PI controller is the lead controller and the P controller is the follower controller. In particular, parameters of the PI controller and/or the P controller are determined based on the frequency response of the controlled system. For example, the parameters of the PI controller are determined using the symmetric optimum method.

In this case, the controlled variable of the inner control circuit can be a velocity, in particular an angular velocity, while the controlled variable of the outer control circuit is the position. For example, thus the angular velocity is controlled in the lower control circuit and the rotation angle is controlled in the upper control circuit.

The object is further achieved according to the present disclosure by a control unit for an electromechanically assisted steering system of a motor vehicle, wherein the electromechanically assisted steering system has electromechanical steering assistance with an electric motor and at least one controller, wherein a torque to be applied by the electric motor is the controlled variable of the at least one controller, and wherein the controlled system for the design of at least one controller comprises at least a lower part of the steering system containing the electric motor, wherein the control unit is designed to carry out a method described above. As regards the advantages, reference is made to the above explanations relating to the method.

The at least one controller can be integrated in the control unit.

The control unit may be designed to determine at least a required torque based on measurement data from the steering system and to transmit corresponding control commands to the electric motor or to a current controller of the electric motor, so that the electric motor provides at least the required torque.

In particular, the control unit is designed to control, in particular to steer, the motor vehicle at least partially automatically, in particular fully automatically. In this case, therefore, the electric motor does not merely provide an auxiliary torque, but rather a full torque necessary for the control of the motor vehicle.

The object is also achieved according to the present disclosure by an electromechanically assisted steering system with a control unit described above and electromechanical steering assistance which has an electric motor and a controller, wherein a torque to be applied by the electric motor is the controlled variable of the at least one controller, and wherein the controlled system for the design of the at least one controller comprises at least a lower part of the steering system containing the electric motor. As regards the advantages, reference is made to the above explanations relating to the method.

In particular, it is an electromechanically assisted steering system with steering column assistance or an electromechanically assisted steering system in which an additional torque is transmitted to the rack via a pinion, a dual pinion, or a belt drive. The steering system can also be a steer-by-wire steering system with no active mechanical connection between the steering wheel and the wheels.

The object is further achieved according to the present disclosure by a computer program with program code means, which are designed to cause the above-described steering system to carry out a method described above when the computer program is executed on a computing unit of the control unit of the steering system. As regards the advantages, reference is made to the above explanations regarding the method.

"Program Code Means" here and below means computer-executable instructions in the form of program code and/or program code modules in compiled and/or uncompiled form, which may be available in any programming language and/or in machine language.

BRIEF DESCRIPTION OF THE DRAWINGS

Further advantages and properties of the present disclosure arise from the following description and the attached drawings to which reference is made. In the figures.

DETAILED DESCRIPTION

Figure 1:
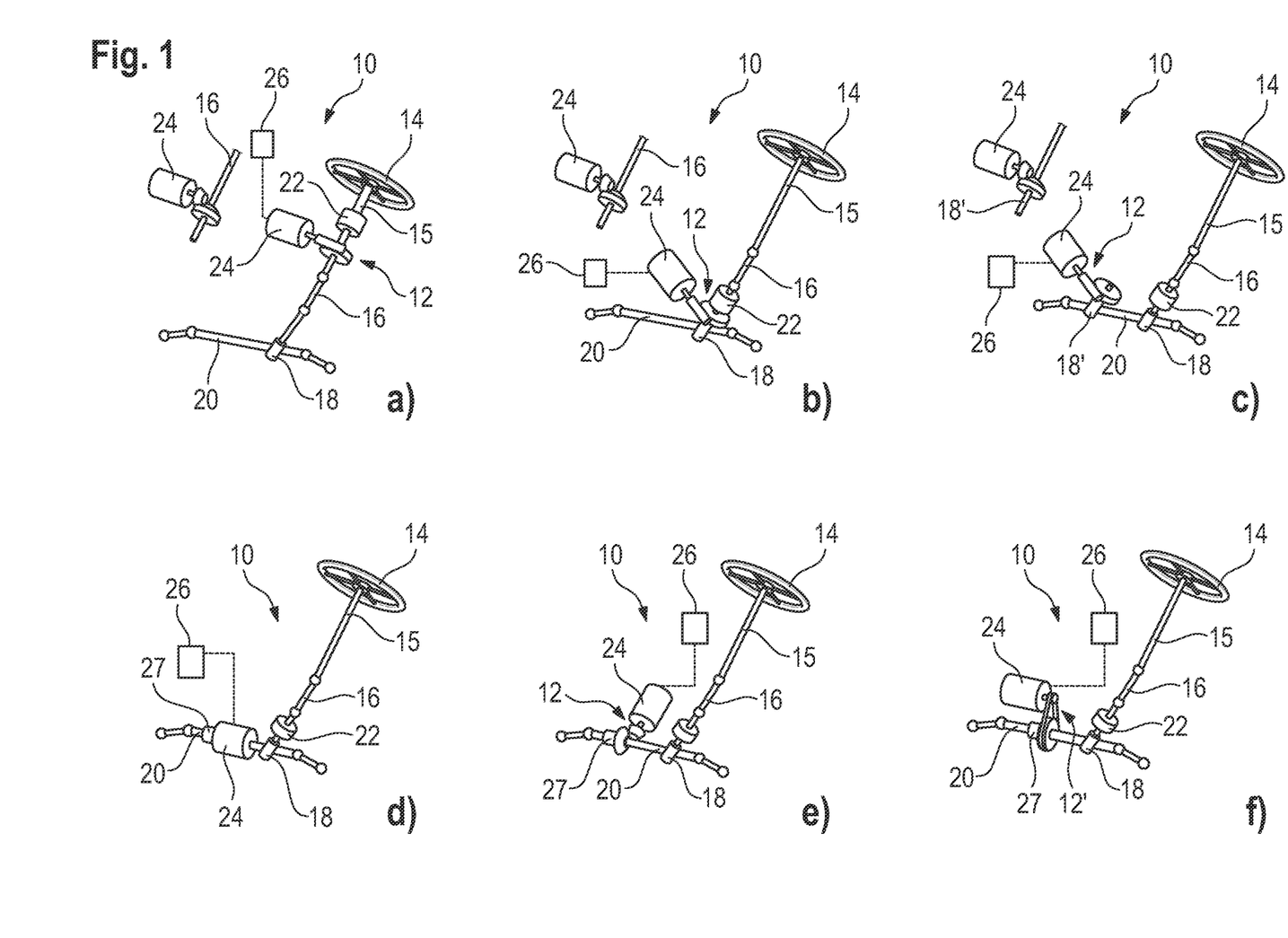
FIG. 1(a) shows a first oblique schematic view of an electromechanically assisted steering system according to the present disclosure.
FIG. 1(b) shows a second oblique schematic view of an electromechanically assisted steering system according to the present disclosure.
FIG. 1(c) shows a third oblique schematic view of an electromechanically assisted steering system according to the present disclosure.
FIG. 1(d) shows a fourth oblique schematic view of an electromechanically assisted steering system according to the present disclosure.
FIG. 1(e) shows a fifth oblique schematic view of an electromechanically assisted steering system according to the present disclosure.
FIG. 1(f) shows a sixth oblique schematic view of an electromechanically assisted steering system according to the present disclosure.

FIG. 1 (a) schematically shows a steering system 10 for a motor vehicle, wherein the steering system 10 has a gearbox 12 and is designed as an electromechanically assisted steering system with steering column assistance ("column drive EPS").

The steering system 10 has a steering wheel 14, which is connected to a first pinion 18 via an upper part of a steering column 15 and via an intermediate steering shaft 16. The first pinion 18 meshes with a rack 20, so that it is subjected to a torque.

On the steering column 15, a torque and/or a steering angle sensor 22 is arranged, which is designed to measure a steering torques and/or a steering angle. In particular, it is thus a steering torque and steering angle sensor, which is also referred to as a "torque and angle sensor (TAS)" and can provide a steering angle in addition to the steering torque.

Furthermore, an electric motor 24 is provided, which has a torque transmission connection to the gearbox 12.

As indicated in FIG. 1(a), the gearbox 12 may be designed in different ways, for example as a worm gear, as a spur gear or as a bevel gear.

In any case at least one torque provided by the electric motor 24 is transmitted to the intermediate steering shaft 16 via the gearbox 12 to carry out a steering movement.

The electric motor 24 has a signal transmission connection to a control unit 26 of the steering system 10, which is only schematically indicated in FIGS. 1(a) to (f).

The control unit 26 is designed to determine at least a torque to be applied and to transmit corresponding control commands to the electric motor 24 based on measurement data from the steering system 10 so that the electric motor 24 provides at least the torque to be applied.

The control unit 26 is further designed to control, in particular to steer, the motor vehicle at least partially automatically, in particular fully automatically. In this case, therefore, the electric motor 24 provides not only a supporting torque, but rather the entire torque necessary for the control or steering of the motor vehicle.

The steering system 10 shown in FIG. 1(b) differs from that shown in FIG. 1(a) in that the electric motor 24 does not have a torque transmission connection via the gearbox 12 to the intermediate steering shaft 16, but to the first pinion 18. The steering system 10 therefore has a single pinion drive, which is also referred to as a "single pinion EPS".

The steering system 10 shown in FIG. 1(c) has a second pinion 18', which is meshed with the rack 20. The electric motor 24 has a torque transmission connection to the second pinion 18' via the gearbox 12. In this case, the steering system 10 is a steering system with dual pinions, which is also referred to as a "dual pinion EPS".

In FIGS. 1(d) through 1(f), further possible designs of the electromechanically assisted steering system 10 are shown.

More specifically, FIG. 1(d) shows a steering system 10 with a concentric rack-and-pinion drive by means of a recirculating ball nut 27. The electric motor 24 is arranged directly on the rack 20 here and subjects the rack 20 to the supporting torque via the recirculating ball nut 27.

FIG. 1(e) shows a drive in which the gearbox 12 is in the form of a bevel gear, and in which a recirculating ball nut 27 is attached to the rack 20. The electric motor 24 subjects the rack 20 to the supporting torque via the gearbox 12 and the recirculating ball nut 27.

FIG. 1(f) shows a belt drive 12' with a recirculating ball nut 27 attached to the rack 20. A supporting torque applied by the electric motor 24 is transmitted via a belt of the belt drive 12' to the recirculating ball nut 27 and via this to the rack 20.

Figure 2:
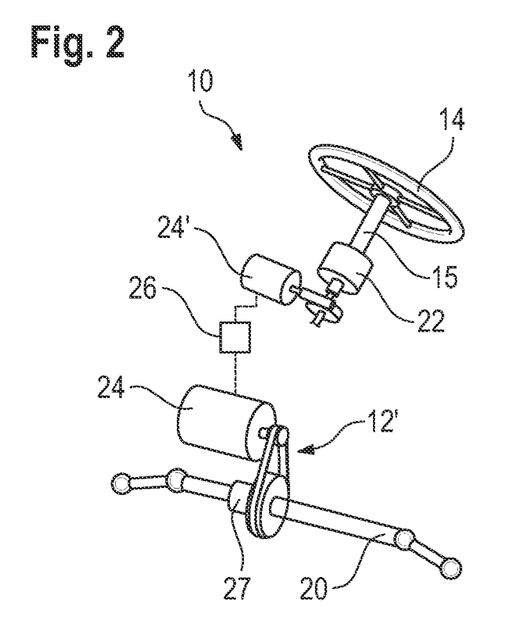
FIG. 2 shows in an oblique schematic view a steer-by-wire variant of the electromechanically assisted steering system according to the present disclosure.

FIG. 2 shows another embodiment of the steering system 10. The steering system is designed here as a steer-by-wire steering system, i.e. there is no mechanical working connection between the steering wheel 14 and the rack 20. Rather, the steering angle sensor 22 determines a steering angle and transmits it to the control unit 26. The control unit 26 controls the electric motor 24, which is connected to the rack 20 by a belt drive, for the generation of a torque necessary for the control or steering of the motor vehicle. In addition, the steering system 10 here has a steering wheel actuator 24', which can subject the steering wheel 14 to a torque, for example to generate road feedback.

Figure 3:
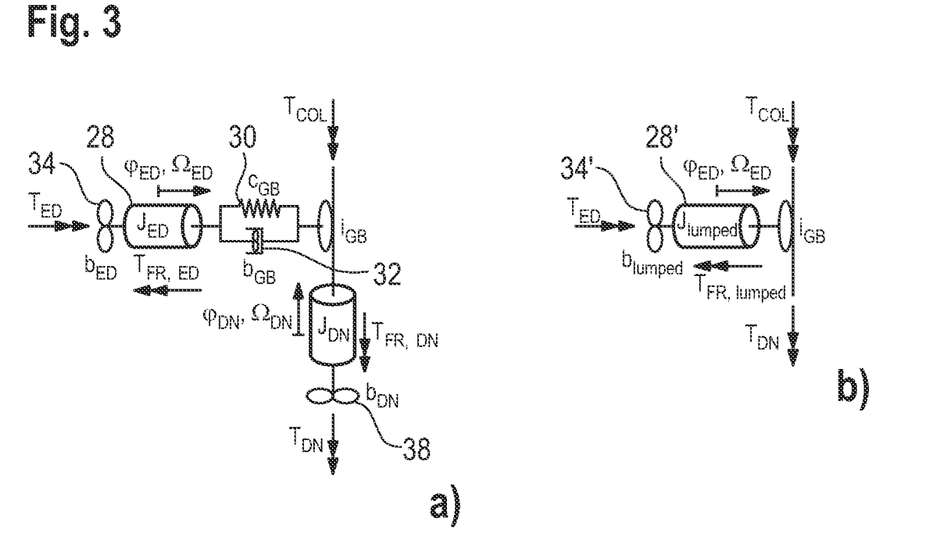
FIG. 3(a) shows a model of a lower part of the electromechanically assisted steering system of FIG. 1.
FIG. 3(b) shows a model of a lower part of the electromechanically assisted steering system of FIG. 2.

The electromechanically assisted steering system 10 is designed to carry out a method for position control described below on the basis of FIGS. 3 to 5.

More specifically, the control unit 26 comprises a computer program with program code means, which are designed to cause the steering system 10 to carry out the position control method described below when the computer program is executed on a computing unit or a processor of the control unit 26 of the steering system 10.

"Program Code Means" means here and the below computer-executable instructions in the form of program code and/or program code modules in compiled and/or uncompiled form, which may be available in any programming language and/or in machine language.

The method for position control is described below by way of example on the basis of FIG. 1(a). It should be noted, however, that the method can also be carried out with the steering systems 10 according to FIGS. 1(b) through (f) and FIG. 2.

First, a physical substitution model of the simplified controlled system in the form of a lower part of the steering system 10 is created, wherein the lower part of the steering system 10 contains the electric motor 24, the gearbox 12, at least part of the intermediate steering shaft 16, the rack 20 and the first pinion 18.

FIGS. 3(a) and (b) show two variants of such a physical substitution model.

In the model of FIG. 3(a) the coupling of the electric motor 24 to the intermediate steering shaft 16 via the gearbox 12 is modeled by a first mass 28 with a moment of inertia $J_{ED}$, a spring 30 with a spring constant $c_{GB}$ and a material attenuation 32 with a damping constant $b_{GB}$. The spring 30 and the material attenuation 32 model the gearbox 12 and the mass 28 models the electric motor 24, more precisely at least an output shaft of the electric motor 24. The gearbox 12 also has a transmission ratio $i_{GB}$.

In addition, by means of attenuation 34 with a damping constant $b_{GB}$ it is taken into account that the torque which the electric motor 24 applies to the gearbox 12 is attenuated by viscous friction, in particular by bearing friction in the electric motor 24. An entire counter-torque $T_{FR,ED}$ caused by Coulomb friction on the electric motor 24 and in the gearbox 12 counteracts the torque $T_{ED}$.

If the driver applies a steering torque to the steering wheel 14, a resulting torsion rod torque $T_{COL}$ also acts on the intermediate steering shaft 16.

The intermediate steering shaft 16, the pinion 18 and the rack 20, i.e. the lower part of the electromechanically assisted steering system 10 without the electric motor 24, are modeled with a second mass 36 and a viscous friction $b_{DN}$ in the form of a second damping 38, wherein the second mass 36 has a moment of inertia $J_{DN}$.

An entire counter-torque $T_{FR,DN}$ acting in the lower part of the steering system 10 without the electric motor 24 and caused by Coulomb friction counteracts a torque $T_{DN}$ acting on the lower part of the intermediate steering shaft 16.

The physical substitution model shown in FIG. 3(a) has two degrees of freedom, namely a rotation angle $\varphi_{DN}$ of the lower part of the intermediate steering shaft 16 and a rotation angle $\varphi_{ED}$ of the electric motor 24.

The respective associated angular velocities of the two degrees of freedom are $\Omega_{ED}=\dot{\varphi}_{ED}$ and $\Omega_{DN}=\dot{\varphi}_{DN}$.

The physical substitution model of FIG. 3(b) is simplified compared to the substitution model of FIG. 3(a). More specifically, the effects of the spring 30 and the material attenuation 32 are neglected. Further, the second mass 36 and the viscous friction in the form of the second damping 38 are aggregated in a modified, effective moment of inertia $J_{lumped}$ of the first mass 28' and an effective damping constant $b_{lumped}$ of the first damping 34' as well as the effective coulomb friction $T_{FR,lumped}$.

The physical substitution model of FIG. 3(a) is thus simplified by reducing the number of degrees of freedom (the degree of freedom $\varphi_{DN}$ is omitted) by introducing effective variables which take into account both the coupling through the gearbox 12 and the lower part of the steering system 10.

Accordingly, the physical substitution model shown in FIG. 3(b) has only one degree of freedom, namely the rotation angle $V_ED$ of the electric motor 24.

Based on the respective physical substitution model, a mathematical model of the lower part of the steering system 10 is created. The mathematical model is in particular differential equations, which relate an output variable of the lower part of the steering system 10, here $\varphi$, to input variables, here, $T_{ED}$, $T_{DN}$ and $T_{COL}$ as well as $T_{FR,ED}$, $T_{FR,DN}$ or $T_{FR,lumped}$ and the degree of freedom of the system.

Based on the mathematical model, a transmission function of the lower part of the steering system 10 is then determined, which serves as the basis for the frequency response and thus the method for position control for the electromechanically assisted steering system 10.

Alternatively or in addition to the procedure described above, the frequency response can also result from measuring a time response of the entire steering system 10.

Figure 4:
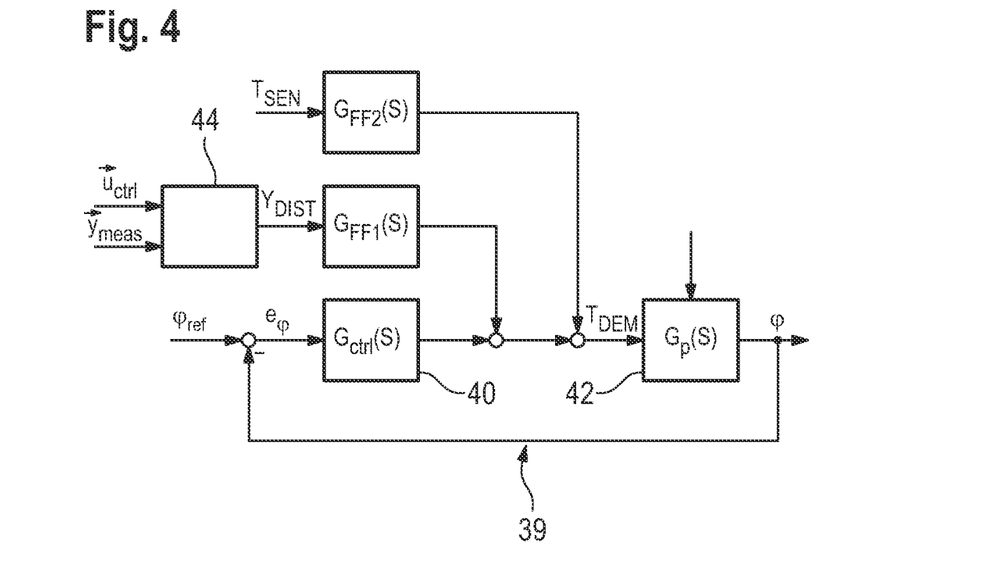
FIG. 4 shows a block diagram of a controller of the electromechanically assisted steering system of FIG. 1 or 2 according to a first embodiment.

In FIG. 4, a control circuit 39 for position control according to a first variant is shown. The control circuit 39 comprises a controller 40, which is in the form of a PID controller, as well as a controlled system 42 ($G_P(s)$). The controlled system 42 is the entire steering system 10.

The controller parameters of the controller 40 are determined based on the frequency response of the simplified controlled system and/or the measured frequency response of the entire controlled system $G_P(s)$. In other words, a transmission function $G_{ctrl}(s)$ of the controller 40 is determined according to predefined criteria.

For example, the controller parameters or the transmission function $G_{ctrl}(s)$ of the controller 40 are adjusted based on the symmetric optimum method.

Basically, the control circuit 39 works as follows:

The control circuit 39 receives a target position $\varphi_{ref}$, which represents the control variable of the controller 40. For example, the target position $\varphi_{ref}$ is provided by the control unit 26 or by an external control unit.

In addition, an actual position $\varphi$, i.e. an actual rotation angle, of the lower part of the steering system 10 is detected, wherein the actual position $\varphi$ represents the controlled variable of the controller 40. The actual position $\varphi$ can be the rotation angle $\varphi_{ED}$ of the electric motor 24 or the rotation angle $\varphi_{DN}$ of the lower part of the intermediate steering shaft 16.

Based on a comparison of the target position $\varphi_{ref}$ with the actual position $\varphi$, a control error $e_\varphi$ is determined, in particular as the difference between the target position $\varphi_{ref}$ and the actual position $\varphi$.

Based on the control error $e_\varphi$, the controller 40 adjusts the controlled variable of the control circuit 39, which results in the torque to be applied $T_{DEM}$ by the electric motor 24.

Disturbance variables acting on the controlled system, for example disturbance torques $T_{DN}$ and/or the combined frictional torques $T_{FR}$, can influence the quality of the position control.

To compensate for the influence of the frictional torques $T_{FR}$ and the disturbance torques $T_{DN}$, an observer 44 is provided, which can be designed based on a state space model of the controlled system 42.

The observer 44 estimates the disturbance torques $T_{DN}$ and/or frictional torques $T_{FR}$ occurring in the controlled system 42 based on at least one vector valued input variable $\vec{u}_{ctrl}$ and at least one vector valued measurement variable $\vec{y}_{meas}$.

In particular, the at least one vector valued input variable $\vec{u}_{ctrl}$ includes the controlled variable of the control circuit 39 while the at least one vector valued measurement variable $\vec{y}_{meas}$ includes the determined actual position φ.

In other words, the disturbance torques $T_{DN}$ and/or the frictional torques $T_{FR}$ are estimated by means of an observer, in particular by means of a Kalman filter, wherein a state space model can be used for estimation. In FIG. 4 $y_{DIST}$ refers to the estimate of the disturbance variables provided by the observer 44.

The state space model does not have to be the same as the mathematical model mentioned above. However, it is based in particular on the same physical substitution model of the lower part of the steering system 10.

The determined disturbance variables $y_{DIST}$ are then fed into the control circuit 39 downstream of the controller 40 by means of a first insertion transfer function $G_{FF1}(S)$.

The determined first insertion transfer function $G_{FF1}(S)$ is such that the disturbance torques $T_{DN}$ and/or the frictional torques $T_{FR}$ are at least partially compensated, in particular completely compensated.

As explained above, only a lower part of the steering system 10 was taken into account in the physical substitution model underlying this control circuit 39. In order to also take into account the influence of the upper part of the steering column 15, i.e. a part above the torque sensor 22, a torque $T_{SEN}$ measured by the torque sensor 22 is inserted into the control circuit by means of a torque transmission function $G_{FF1}(s)$, namely downstream of the controller 40.

As a result, the controlled variable of the control circuit 39 is adjusted, whereby the influence of the upper part of the steering system 10, more precisely the influence of the measured torque $T_{SEN}$, on the movement of the part below the torque sensor 22 is taken into account. The measured torque $T_{SEN}$ is in particular the torsion rod torque $T_{COL}$ resulting from a position of the steering wheel 14 relative to the lower part of the steering system 10.

Consequently, in the position control method described above, on the one hand disturbances in the lower part of the steering system and on the other hand the torque acting between the upper and lower parts of the steering system 10 are compensated.

Figure 5:
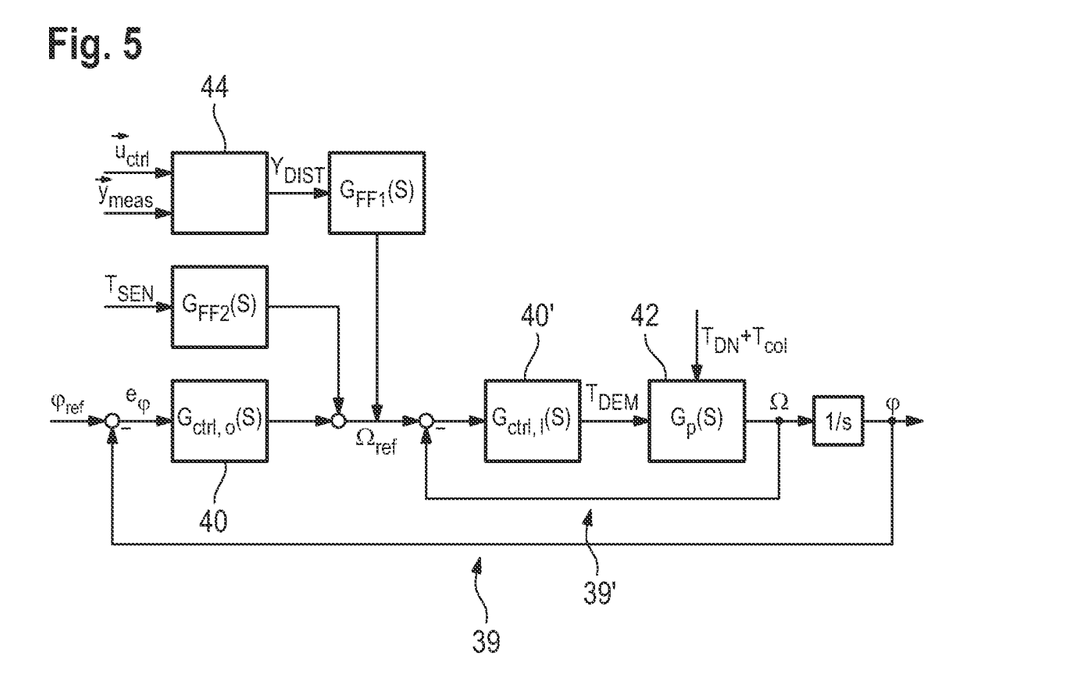
FIG. 5 shows a block diagram of a controller of the electromechanically assisted steering system of FIG. 1 or 2 according to a second embodiment.

In FIG. 5, a control circuit 39 for position control according to a second variant is shown. The control circuit 39 comprises a controller 40, which is in the form of a PI controller.

In contrast to the variant shown in FIG. 4, the control circuit 39 also comprises an inner control circuit 39' with a second controller 40', which is in the form of a P controller, wherein the controlled system 42 is arranged in the inner control circuit 39'. In other words, it is a PI-P cascade circuit, wherein the PI controller 40 is the lead controller and the P controller 40' is the follower controller.

The controlled variable of the inner control circuit 39' is the angular velocity Ω in this case. The angular velocity Ω is not normally measured directly but is determined by a time derivative based on the angle .

The controlled variable of the control circuit 39 is the rotation angle φ and the output of the controller 40 provides the target angular velocity for the inner control circuit 39'.

The controlled variable of the control circuit 39 may be the rotation angle $φ_{ED}$ of the electric motor 24 or the rotation angle $φ_{DN}$ of the lower part of the intermediate steering shaft 16.

Accordingly, the controlled variable of the inner control circuit 39' may be the angular velocity $Ω_{ED}$ of the electric motor 24 or the angular velocity $Ω_{DN}$ of the lower part of the intermediate steering shaft 16.

The influence of disturbance variables $T_{FR}$ and $T_{DN}$ as well as the influence of the torque $T_{SEN}$ resulting from the position of the steering wheel 14 relative to the lower part of the steering system 10 as well as the influence of disturbance variables $T_{FR}$ and $T_{DN}$, analogous to the case described above with respect to FIG. 4, is taken into account or compensated by introducing the estimated disturbance variables $y_{DIST}$ and the measured torque $T_{SEN}$ into the control circuit (39) by means of a first insertion transfer function $G_{FF1}(s)$ or by means of a second insertion transfer function $G_{FF2}(s)$.

The insertion into the control circuit 39 is carried out here downstream of the controller 40, but upstream of the inner control circuit 39'.

What is claimed is:

1. A method for position control for an electromechanically assisted steering system of a motor vehicle which has electromechanical steering assistance with an electric motor and at least one controller, wherein a torque $T_{DEM}$ be applied by the electric motor is a controlled variable of at least one controller, and wherein the controlled system for the controller design of at least one controller comprises at least a lower part of the steering system containing the electric motor, with the following steps:

determining a frequency response of the controlled system based on a mathematical model of a simplified controlled system comprised of only the lower part of the steering system;

adjusting controller parameters of the at least one controller based on the frequency response of the controlled system, wherein the controller parameters of the at least one controller are determined based on the symmetric optimum method;

generating and/or receiving at least one target position;

recording and returning at least one actual position, wherein the at least one actual position is a rotation angle of the electric motor and/or a rotation angle of a torque sensor of the steering system; and adjusting the controlled variable by means of the at least one controller based on a comparison of the at least one target position with the at least one actual position, wherein an observer is designed, which determines disturbance torques acting on the controlled system and/or frictional torques occurring in the controlled system, wherein based on the determined disturbance torques and/or frictional torques the controlled variable of the at least one controller is adjusted so that the disturbance torques and/or frictional torques are at least partially compensated, wherein the determined disturbance torques and/or frictional torques are inserted into the control circuit downstream of the at least one controller by means of a first insertion transfer function, and wherein a torque resulting from a position of a steering wheel relative to the lower part of the steering system is determined and based on the controlled variable of the at least one controller is adjusted, in particular wherein the resulting torque is determined by means of a torque sensor.

2. The method as claimed in claim 1, wherein the determined torque is inserted into the control circuit downstream of the at least one controller by means of a second insertion transfer function.

3. The method as claimed in claim 2, wherein the at least one controller is a PID controller.

4. The method as claimed in claim 3, wherein a PI controller and a P controller are provided in a cascade circuit, in particular wherein the PI controller is the lead controller and the P controller is the follower controller.

* * * * *